(12) United States Patent
Griffiths et al.

(10) Patent No.: US 7,782,517 B2
(45) Date of Patent: Aug. 24, 2010

(54) INFRARED AND DUAL MODE DISPLAYS

(75) Inventors: Jonathan Charles Griffiths, Fremont, CA (US); Jeffrey B. Sampsell, Pueblo West, CO (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 11/766,725

(22) Filed: Jun. 21, 2007

(65) Prior Publication Data

US 2008/0316568 A1    Dec. 25, 2008

(51) Int. Cl.
G02B 26/00 (2006.01)
G02B 26/08 (2006.01)
G02F 1/03 (2006.01)

(52) U.S. Cl. .................... 359/237; 359/263; 359/303

(58) Field of Classification Search ............... 359/237, 359/245, 260–261, 263, 298, 301–303
See application file for complete search history.

(56) References Cited

U.S. PATENT DOCUMENTS

| | | | |
|---|---|---|---|
| 3,728,030 A | 4/1973 | Hawes | |
| 3,955,190 A | 5/1976 | Teraishi | |
| 4,403,248 A | 9/1983 | Te Velde | |
| 4,441,791 A | 4/1984 | Hornbeck | |
| 4,560,435 A | 12/1985 | Brown et al. | |
| 4,655,554 A | 4/1987 | Armitage | |
| 4,786,128 A | 11/1988 | Birnbach | |
| 4,859,060 A * | 8/1989 | Katagiri et al. | 356/454 |
| 4,954,789 A | 9/1990 | Sampsell | |
| 4,956,619 A | 9/1990 | Hornbeck | |
| 4,982,184 A | 1/1991 | Kirkwood | |
| 5,022,745 A | 6/1991 | Zahowski et al. | |
| 5,028,939 A | 7/1991 | Hornbeck et al. | |
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |

(Continued)

FOREIGN PATENT DOCUMENTS

EP    0 668 490    8/1995

(Continued)

OTHER PUBLICATIONS

Feenstra et al., Electrowetting displays, Liquivista BV, 16 pp., Jan. 2006.

(Continued)

Primary Examiner—Scott J Sugarman
Assistant Examiner—Dawayne A Pinkney
(74) Attorney, Agent, or Firm—Knobbe Martens Olson & Bear LLP

(57) ABSTRACT

One inventive aspect relates to a display comprising a display element configured to selectively reflect light of a first wavelength in the infrared range and light of a second wavelength in the visible spectrum. Another inventive aspect relates to a color display comprising at least three reflective display elements. Each display element is configured to selectively reflect light of a different wavelength in the visible range. At least one of the three reflective display element is further configured to selectively reflect light of a wavelength in the infrared range.

46 Claims, 11 Drawing Sheets

U.S. PATENT DOCUMENTS

| | | |
|---|---|---|
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,559,358 A | 9/1996 | Burns et al. |
| 5,561,523 A | 10/1996 | Blomberg et al. |
| 5,636,052 A | 6/1997 | Arney et al. |
| 5,646,729 A | 7/1997 | Koskinen et al. |
| 5,646,768 A | 7/1997 | Kaeiyama |
| 5,661,592 A | 8/1997 | Bornstein et al. |
| 5,665,997 A | 9/1997 | Weaver et al. |
| 5,710,656 A | 1/1998 | Goosen |
| 5,719,068 A | 2/1998 | Suzawa et al. |
| 5,734,177 A | 3/1998 | Sakamoto |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 5,914,804 A | 6/1999 | Goossen |
| 5,920,418 A | 7/1999 | Shiono et al. |
| 5,961,848 A | 10/1999 | Jacquet et al. |
| 5,986,796 A | 11/1999 | Miles |
| 6,028,689 A | 2/2000 | Michalicek et al. |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,195,196 B1 * | 2/2001 | Kimura et al. .............. 359/295 |
| 6,242,932 B1 | 6/2001 | Hembree |
| 6,262,697 B1 | 7/2001 | Stephenson |
| 6,327,071 B1 | 12/2001 | Kimura |
| 6,356,378 B1 | 3/2002 | Huibers |
| 6,377,321 B1 | 4/2002 | Khan et al. |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,794,119 B2 | 9/2004 | Miles |
| 6,813,059 B2 | 11/2004 | Hunter et al. |
| 6,841,081 B2 | 1/2005 | Chang et al. |
| 6,844,959 B2 | 1/2005 | Huibers et al. |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,980,350 B2 | 12/2005 | Hung et al. |
| 6,982,820 B2 | 1/2006 | Tsai |
| 7,006,272 B2 | 2/2006 | Tsai |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,973 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,289,259 B2 | 10/2007 | Chui et al. |
| 7,302,157 B2 | 11/2007 | Chui |
| 7,321,457 B2 | 1/2008 | Heald |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,629,197 B2 | 12/2009 | Luo et al. |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0015215 A1 | 2/2002 | Miles |
| 2002/0024711 A1 | 2/2002 | Miles |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0001797 A1 | 1/2005 | Miller et al. |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0168849 A1 | 8/2005 | Lin |
| 2005/0179378 A1 | 8/2005 | Oooka et al. |

| | | |
|---|---|---|
| 2005/0195462 A1 | 9/2005 | Lin |
| 2005/0212738 A1 | 9/2005 | Gally |
| 2005/0249966 A1 | 11/2005 | Tung et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066935 A1 | 3/2006 | Cummings et al. |
| 2006/0066936 A1* | 3/2006 | Chui et al. ................ 359/291 |
| 2006/0066938 A1 | 3/2006 | Chui |
| 2006/0067643 A1 | 3/2006 | Chui |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077507 A1 | 4/2006 | Chui et al. |
| 2006/0077508 A1 | 4/2006 | Chui et al. |
| 2006/0077515 A1 | 4/2006 | Cummings |
| 2006/0077516 A1 | 4/2006 | Kothari |
| 2006/0079048 A1 | 4/2006 | Sampsell |
| 2006/0220160 A1 | 10/2006 | Miles |
| 2006/0262380 A1 | 11/2006 | Miles |
| 2006/0268388 A1 | 11/2006 | Miles |
| 2006/0274074 A1 | 12/2006 | Miles |
| 2006/0274398 A1 | 12/2006 | Chou |
| 2007/0020948 A1 | 1/2007 | Piehl et al. |
| 2007/0040777 A1 | 2/2007 | Cummings |
| 2007/0077525 A1 | 4/2007 | Davis et al. |
| 2007/0086078 A1 | 4/2007 | Hagood et al. |
| 2007/0121118 A1 | 5/2007 | Gally et al. |
| 2007/0138608 A1 | 6/2007 | Ikehashi |
| 2007/0177247 A1 | 8/2007 | Miles |
| 2007/0194630 A1 | 8/2007 | Mingard et al. |
| 2007/0216987 A1 | 9/2007 | Hagood et al. |
| 2007/0279729 A1 | 12/2007 | Kothari et al. |
| 2007/0285761 A1 | 12/2007 | Zhong et al. |
| 2008/0003710 A1 | 1/2008 | Kogut et al. |
| 2008/0013144 A1 | 1/2008 | Chui et al. |
| 2008/0013145 A1 | 1/2008 | Chui et al. |
| 2008/0013154 A1 | 1/2008 | Chui |
| 2008/0037093 A1 | 2/2008 | Miles |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0186581 A1 | 8/2008 | Bita et al. |
| 2008/0239455 A1 | 10/2008 | Kogut et al. |
| 2008/0247028 A1 | 10/2008 | Chui et al. |
| 2008/0278787 A1 | 11/2008 | Sasagawa |
| 2008/0278788 A1 | 11/2008 | Sasagawa |
| 2008/0316566 A1 | 12/2008 | Lan |
| 2009/0068781 A1 | 3/2009 | Tung et al. |
| 2009/0080060 A1 | 3/2009 | Sampsell et al. |
| 2009/0135465 A1 | 5/2009 | Chui |
| 2009/0201566 A1 | 8/2009 | Kothari |
| 2009/0213450 A1 | 8/2009 | Sampsell |
| 2009/0213451 A1 | 8/2009 | Tung et al. |
| 2009/0256218 A1 | 10/2009 | Mignard et al. |
| 2009/0273823 A1 | 11/2009 | Tung et al. |
| 2009/0273824 A1 | 11/2009 | Sasagawa |
| 2009/0279162 A1 | 11/2009 | Chui |
| 2010/0039370 A1 | 2/2010 | Miles |

FOREIGN PATENT DOCUMENTS

| | | |
|---|---|---|
| EP | 1 122 577 | 8/2001 |
| EP | 1 227 346 | 7/2002 |
| EP | 1 275 997 | 1/2003 |
| EP | 1 473 581 | 11/2004 |
| JP | 5-49238 | 2/1993 |
| JP | 5-281479 | 10/1993 |
| JP | 11211999 | 8/1999 |
| JP | 2002-062490 | 2/2000 |
| JP | 2001-221913 | 8/2001 |
| JP | 2002-221678 | 8/2002 |
| JP | 2003-340795 | 2/2003 |
| JP | 2004-012642 | 1/2004 |
| JP | 2004-212638 | 7/2004 |
| JP | 2004-212680 | 7/2004 |
| JP | 2005 279831 | 10/2005 |
| WO | WO 98/14804 | 4/1998 |
| WO | WO 99/52006 | 10/1999 |
| WO | WO 02/086582 | 10/2002 |
| WO | WO 2007/036422 | 4/2007 |
| WO | WO 2007/053438 | 5/2007 |
| WO | WO 2007/072998 | 6/2007 |

OTHER PUBLICATIONS

Lezec, Submicrometer dimple array based interference color field displays and sensors, Nano Lett. 7(2):329-333, Dec. 23, 2006.
Conner, "Hybrid Color Display Using Optical Interference Filter Array," SID Digest, pp. 577-580 (1993).
Jerman et al., "A Miniature Fabry-Perot Interferometer with a Corrugated Silicon Diaphragm Support", (1988).
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.
Miles, Mark, W., "A New Reflective FPD Technology Using Interferometric Modulation", The Proceedings of the Society for Information Display (May 11-16, 1997).
Taii et al., "A transparent sheet display by plastic MEMS," Journal of the SID 14(8):735-741, 2006.
Pape et al., Characteristics of the deformable mirror device for optical information processing, Optical Engineering, 22(6):676-681, Nov.-Dec. 1983.
Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.
Extended European Search Report dated Oct. 13, 2008 in App. No. 08153564.3.
Miles, Interferometric modulation: MOEMS as an enabling technology for high performance reflective displays, Proceedings of SPIE, vol. 4985, pp. 131-139, 2003.
ISR and WO for PCT/US08/067249.
Longhurst, 1963, Chapter IX: Multiple Beam Interferometry, in Geometrical and Physical Optics, pp. 153-157.
Tolansky, 1948, Chapter II: Multiple-Beam Interference, in Multiple-bean Interferometry of Surfaces and Films, Oxford at the Clarendon Press, pp. 8-11.
IPRP dated Jan. 7, 2010 for PCT/US08/067249.

* cited by examiner

| | Column Output Signals | |
|---|---|---|
| | $+V_{bias}$ | $-V_{bias}$ |
| Row Output Signals 0 | Stable | Stable |
| $+\Delta V$ | Relax | Actuate |
| $-\Delta V$ | Actuate | Relax |

INFRARED AND DUAL MODE DISPLAYS

BACKGROUND OF THE INVENTION

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN INVENTION ASPECTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one aspect, a display is disclosed. The display comprises a display element configured to selectively reflect light of a first wavelength in the infrared range and light of a second wavelength in the visible range.

In another aspect, a color display is disclosed. The display comprises at least three reflective display elements. Each display element is configured to selectively reflect light of a different wavelength in the visible range. At least one of the three reflective display element is further configured to selectively reflect light of a wavelength in the infrared range.

In another aspect, a display is disclosed. The display comprises means for selectively reflecting light of a wavelength in the visible range and light of a wavelength in the infrared range. The display further comprises means for sending at least one signal to the reflecting means.

In another aspect, a method of operating a display is disclosed. The method comprises switching the display from a visible mode to an infrared mode. The method further comprises driving the display with a scheme associated with the infrared mode.

In another aspect, a method of making a display is disclosed. The method comprises making a display element configured to selectively reflect light of a first wavelength in the infrared range and light of a second wavelength in the visible range.

In another aspect, a display is disclosed. The display comprises a first display element configured to selectively reflect light of a first range of wavelengths and a second range of wavelengths, wherein each of the first and second ranges are within one of the ultraviolet, visible, or infrared spectrums.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Certain embodiments provide a display reflective in both the visible and infra red (IR) spectrum. The display may comprise one or more interferometric modulators. In one embodiment, the display is useable in two modes: visible mode and infra red mode. The display may further comprise a mechanism to switch between these two modes. FIGS. 1-7 illustrate an interferometric display and FIGS. 8-13 illustrate an interferometric display reflective in both the visible and IR spectrum.

Figure 1:
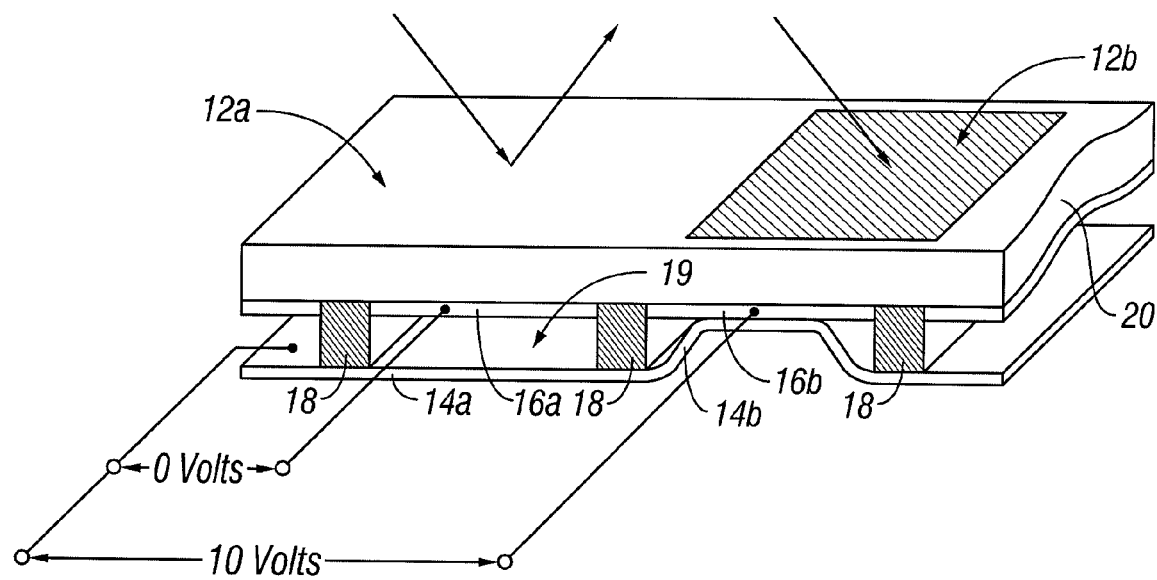
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. A display made up of identical pixels capable of rendering a single color (or wavelength) in each of the open or closed states is known as a bi-chrome display (e.g., a black and yellow display, or a red and green display). MEMS pixels can be configured to reflect predominantly at selected colors, allowing for a color display in addition to a bi-chrome display. Similarly, MEMS pixels can be configured to reflect predominately at a nonvisible wavelength, or a combination of wavelengths, such as for an IR display, or a display that is capable of operating at both IR and visible wavelengths.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel. The gap between the two layers in part determines the wavelengths of maximum reflectivity. The gap may generate multiple responses, which are harmonically related. As used herein, the longest wavelength for which a constructive interference reflectivity maximum is generated is known as a first order response, or in the case of a visible reflection, a first order color. A constructive interference reflectivity maximum at half the wavelength of the first order maximum is known as a second order response and so on, for one third, one quarter, or more times the wavelength of the first order response. An interferometric modulator display may be designed to have several simultaneous reflective maximums, some at visible and some at invisible wavelengths, depending on the wavelength of the first order responses.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
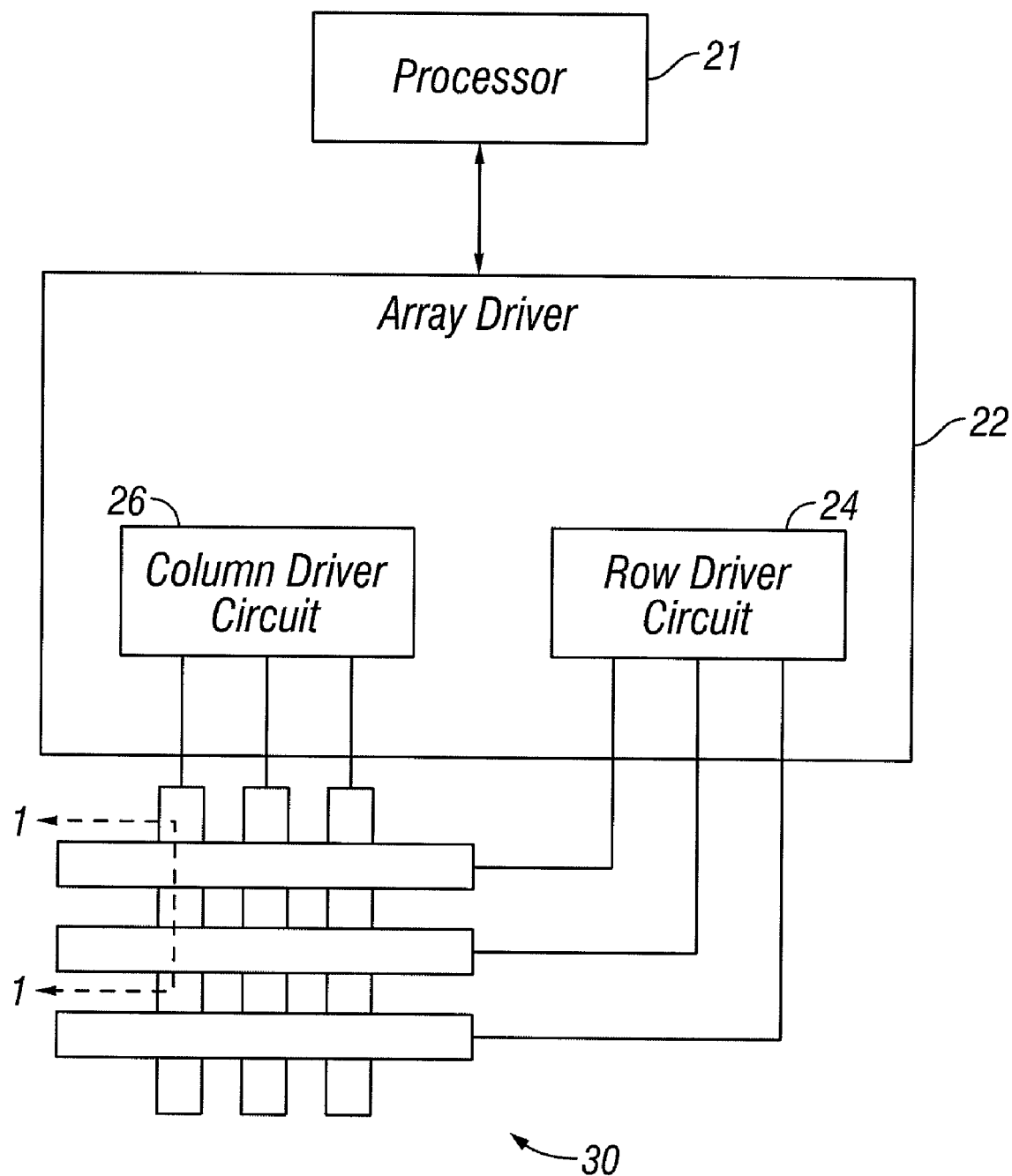
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
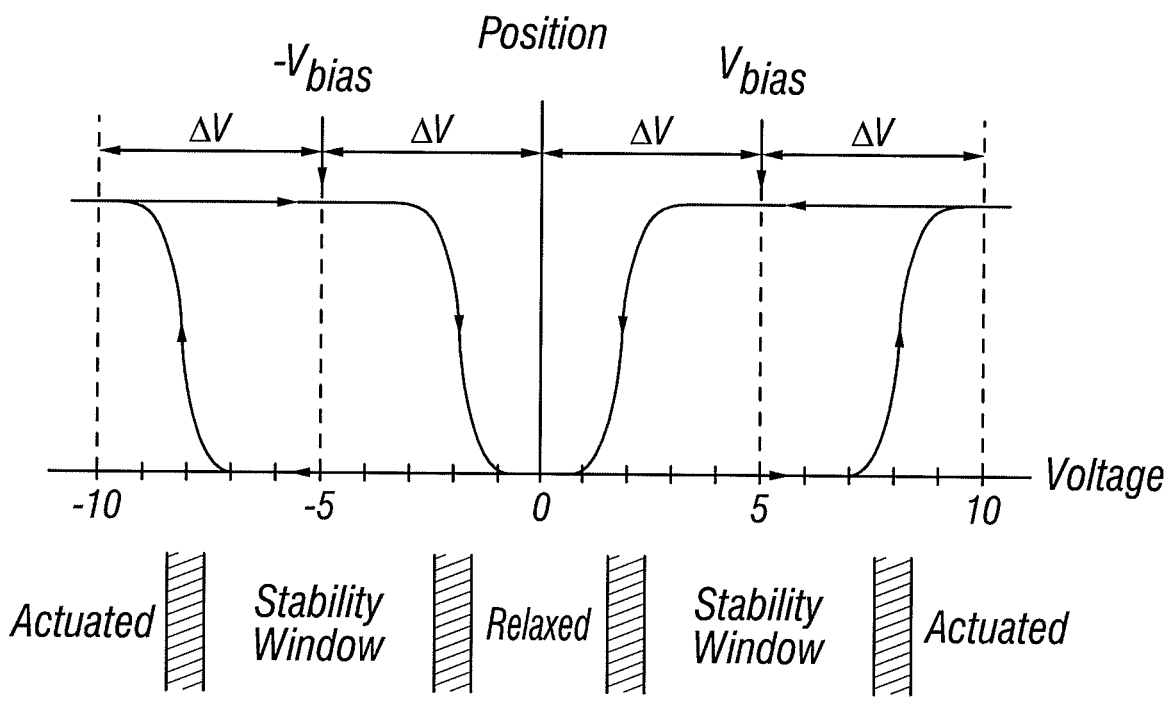
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
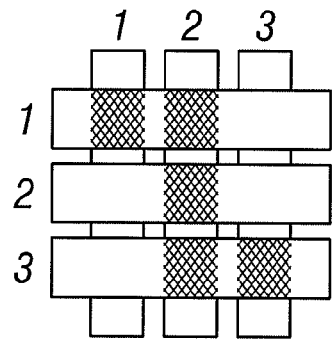
FIG. 5A illustrates one exemplary frame of display data in the 3×3 interferometric modulator display of FIG. 2.
Figure 5B:
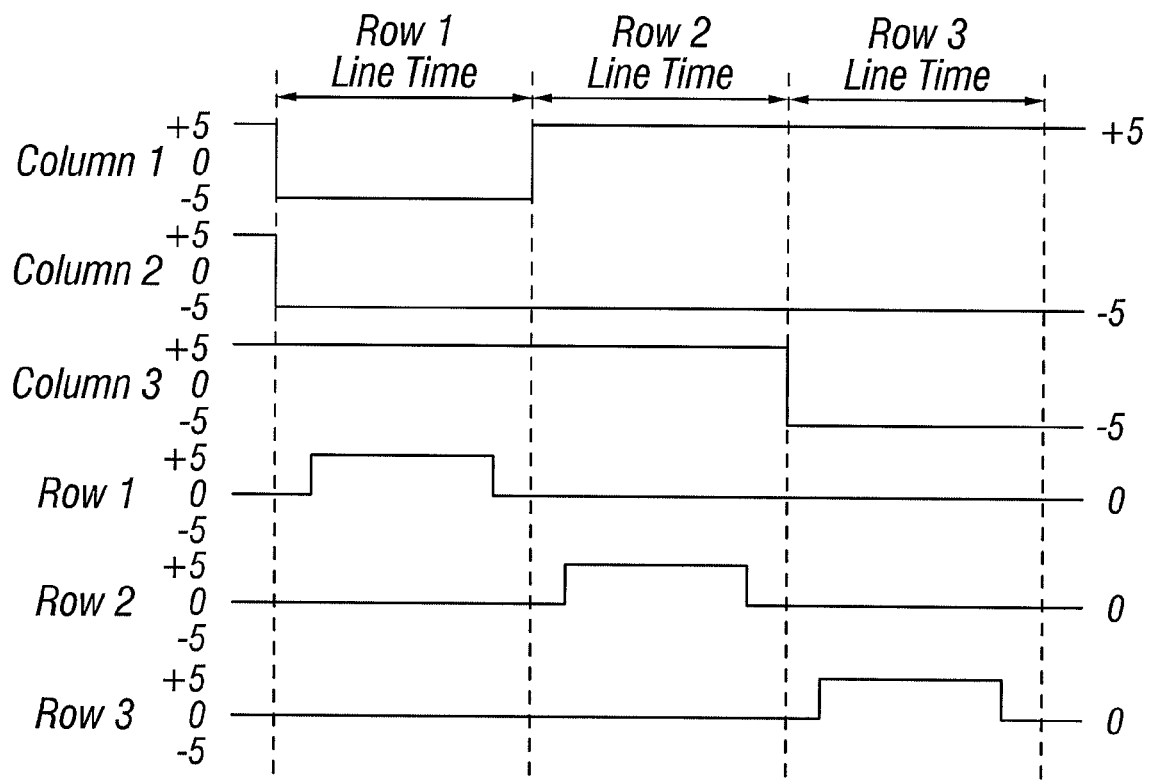
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
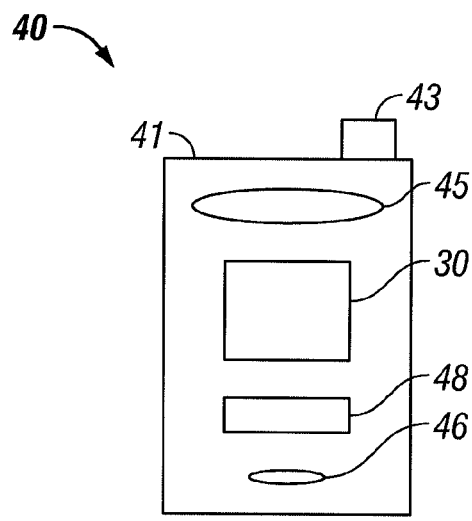
FIGS. 6A and 6B are system block diagrams illustrating an embodiment of a visual display device comprising a plurality of interferometric modulators.
Figure 6B:
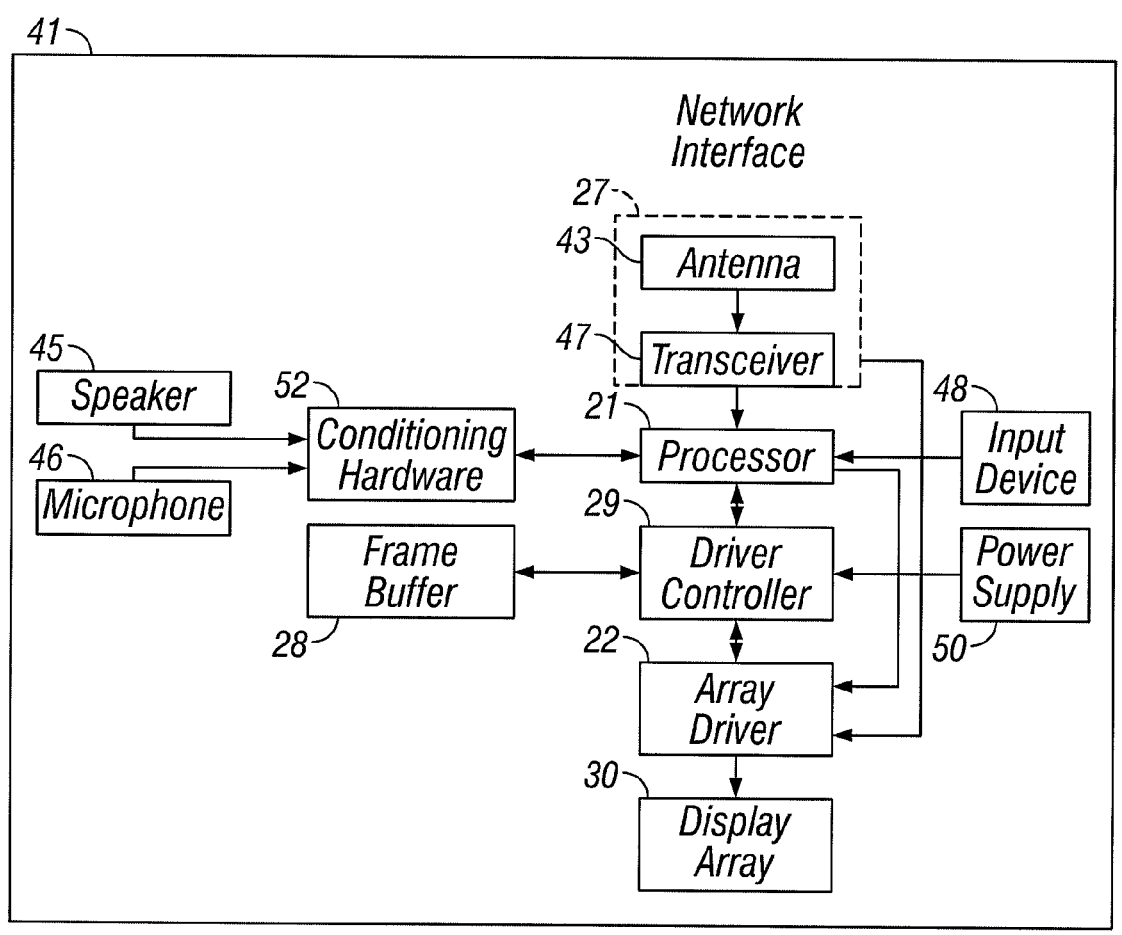

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
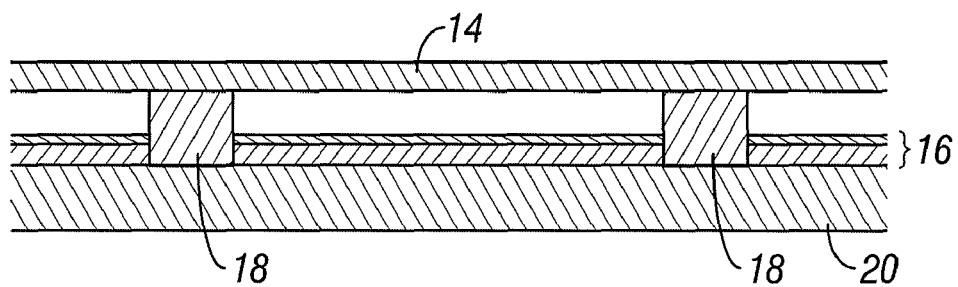
FIG. 7A is a cross section of the device of FIG. 1.
Figure 7B:
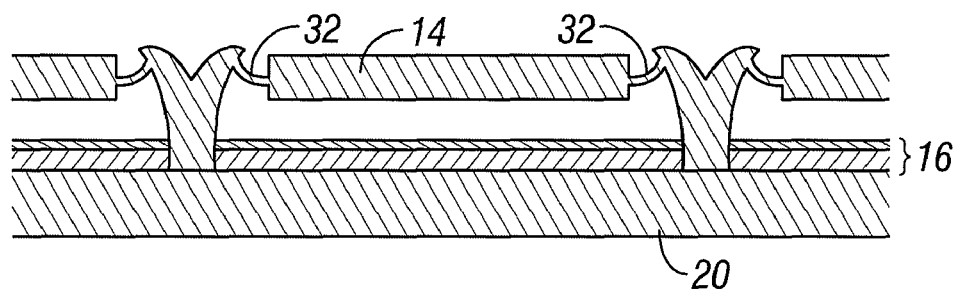
FIG. 7B is a cross section of an alternative embodiment of an interferometric modulator.
Figure 7C:
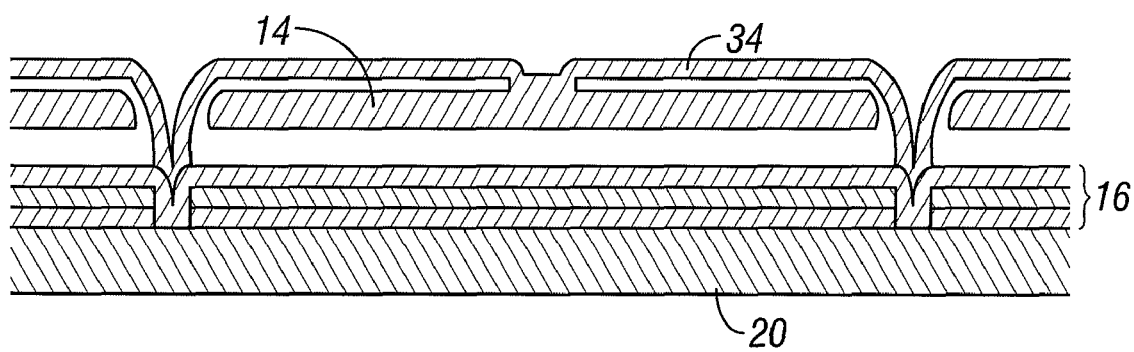
FIG. 7C is a cross section of another alternative embodiment of an interferometric modulator.
Figure 7D:
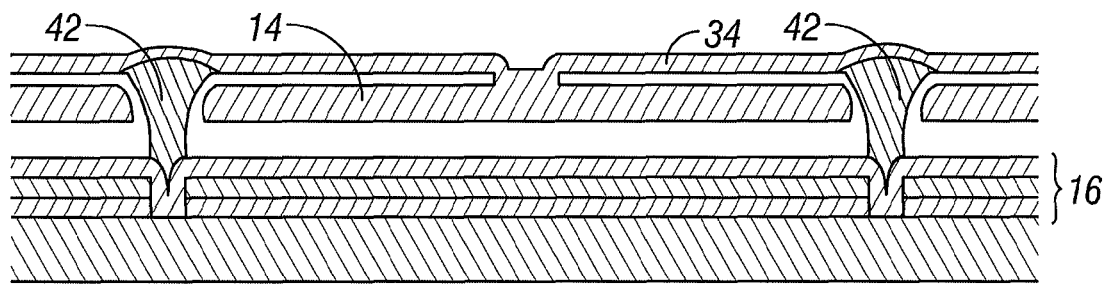
FIG. 7D is a cross section of yet another alternative embodiment of an interferometric modulator.
Figure 7E:
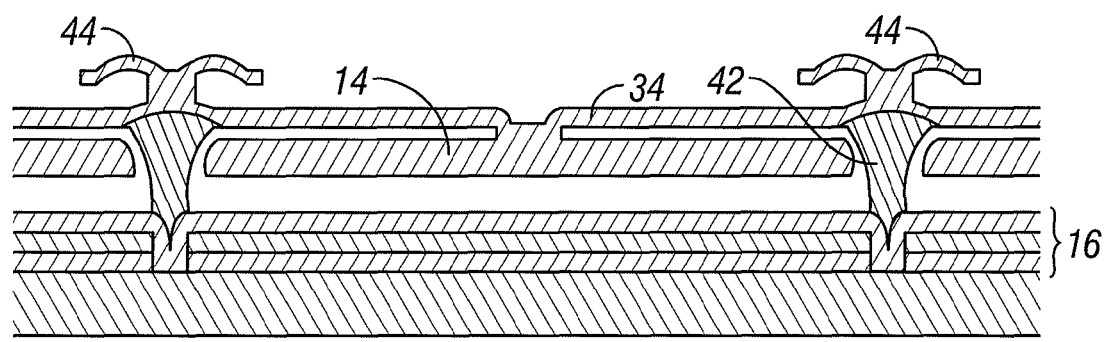
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Some applications require a dual display that is viewable in both the visible and IR spectrum. Depending on the particular applications, the dual display could be either viewable in both the visible and IR spectrum simultaneously, or operate in two distinct modes being viewable only in one of the IR spectrum and the visible spectrum in each mode. Other applications may require a display viewable only in the IR spectrum. In military operations, it is critical not to emit visible light at night which can be picked up by enemy. A display which is visible at day and visible only to an IR imaging device at night can help avoid light emission in the visible spectrum at night. A display visible in both the visible and IR spectrum simultaneously may help a firefighter using IR imaging equipment in thick smoke to operate equipment fitted with such a display.

There are several solutions to the dual display, but each of them has its own drawbacks. One approach is to light a liquid crystal display (LCD) with an IR backlight, in addition to a visible spectrum backlight. But a LCD display has a poor IR contrast ratio as it passes significant IR in the dark state. In an emissive display, such as an Organic Light Emitting Diode (OLED) display, an approach could be to include an additional IR LED at each pixel, in addition to visible spectrum LEDs, Although it is possible to operate as an IR and visible spectrum display, this design is expensive and energy-consuming, because an additional IR LED is required at each pixel. In addition, as an emissive display, it is more likely to be detected in situations where low visible or IR emissions are desirable, such as military applications.

Certain embodiments as will be described below provide an interferometric display that is reflective in both the visible and IR spectrum. The display may form an image in the visible spectrum when it is in daylight or under artificial light. The display may form an image in the IR spectrum when, for example, being illuminated with an IR light source. Different embodiments can provide a display operable simultaneously in visible and IR spectrum, or usable in only one of two modes, being viewable to only one of the spectrums in each mode. These embodiments provide several benefits, among the others, over the existing approaches. First, the interferometric display consumes lower power. Second, a reflective display only reflects light incident upon it. This further enhances its covert capabilities, since an IR emissive display could be a significant source of IR radiation which may be visible to enemy equipped with night vision equipment.

Each of these embodiments comprises an interferometric modulator such as one illustrated in FIG. 1. As discussed above, an interferometric modulator is configured to be either in a bright or dark state. In the bright state, the interferometric modulator reflects a large portion of incident visible light to a user. When in the dark state, it reflects little incidence visible light to the user. The reflective spectral characteristics of the interferometric modulator are dependent on the optical gap between the reflective layers 14a and 16a (see FIG. 1). By modifying the optical gap, an interferometric modulator may reflect light within both the visible and IR spectrum.

The IR image is visible to a human observer using an IR imaging device. The required IR response of the display may vary depending on the IR imaging device to be used. Typically, IR imaging systems fall into two broad areas: near IR in the range of approximately 800-1200 nm, and longer wavelength IR in the range of approximately 3-5 μm and 8-12 μm range. Near IR is often employed where IR extension to a visible light imaging system is needed, while longer wavelength IR is often used in IR only imaging systems.

Figure 8:
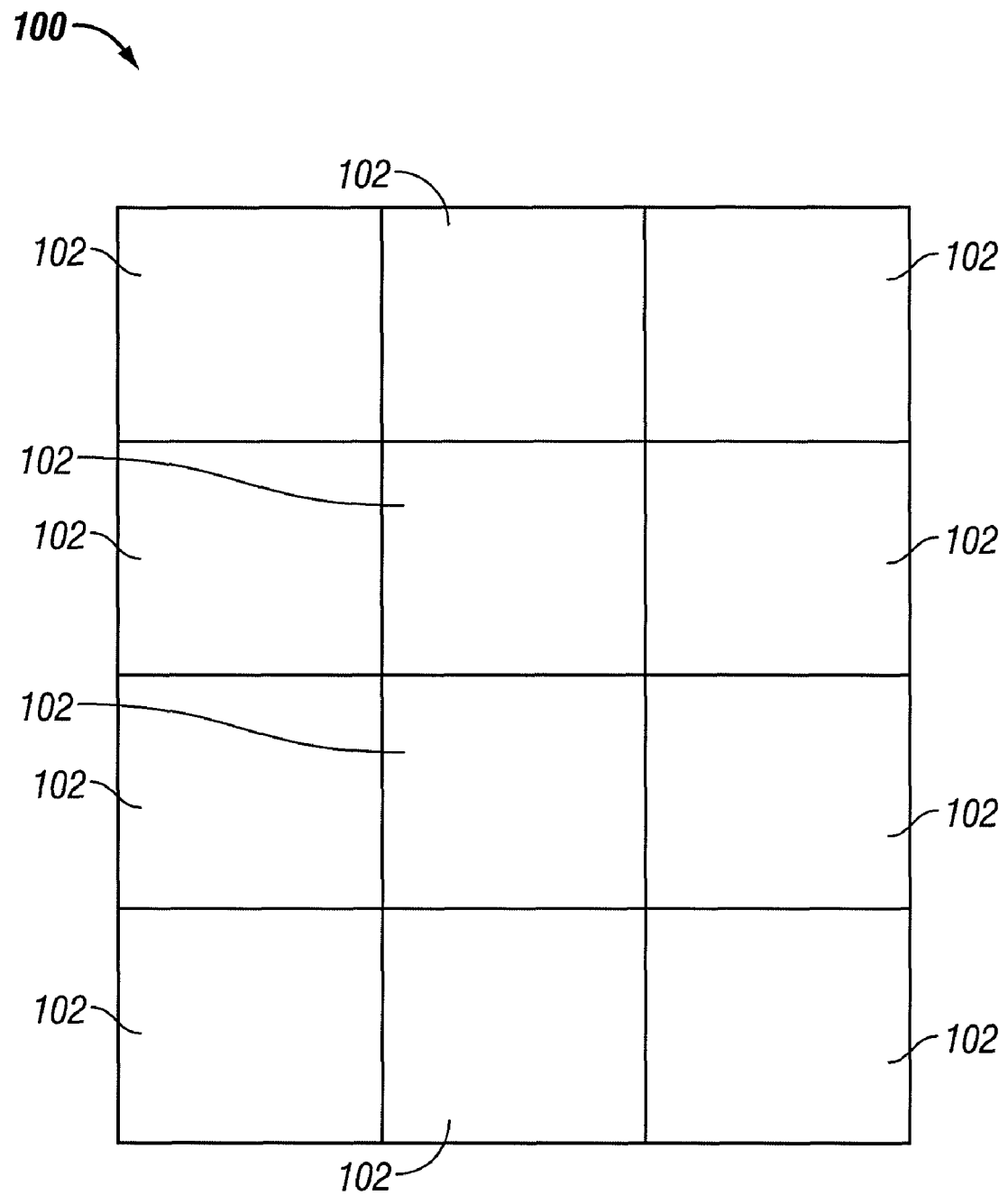
FIG. 8 illustrates one embodiment of a bi-chrome display 100 visible in both the visible and IR spectrum.

FIG. 8 illustrates one embodiment of a bi-chrome display 100 visible in both the visible and IR spectrum. The display 100 may comprise an array of pixels 102. Each pixel 102 comprises an interferometric modulator as illustrated in FIG. 1.

The interferometric modulator may have its optical gap in the dark state set to an appropriate length such that the modulator reflects little incidence light to the user within the visible and IR spectrum in the dark state. In one example, the peak of the reflective response in the dark state moves into the ultra violet (UV) spectrum.

The interferometric modulator may have its optical gap in the bright state set such that the modulator has a first order bright state reflective response in the IR range, which leads to higher order responses in the visible range. Therefore, the display will reflect light within both the visible and IR spectrum in the bright state. In one embodiment, a single higher order response in the visible range is used to produce a single visible color. In another embodiment, several higher order responses are created at colors that are together perceived as a specific hue. As used herein, "hue" refers to the color perceived by a human observer of the reflected light. In one example simultaneous red, green and blue spectral responses can be created which are together perceived as a white hue.

In one embodiment, the interferometric modulator has its bright state optical gap set to an appropriate length such that the interferometric modulator has a first order reflective response in the approximately 800 to 1200 nm IR range, thus leading to a second order response in the visible range. The color of the second order response will vary within the visible range as the first order reflective response varies in the approximately 800 to 1200 nm IR, depending on the bright state optical gap.

Figure 9:
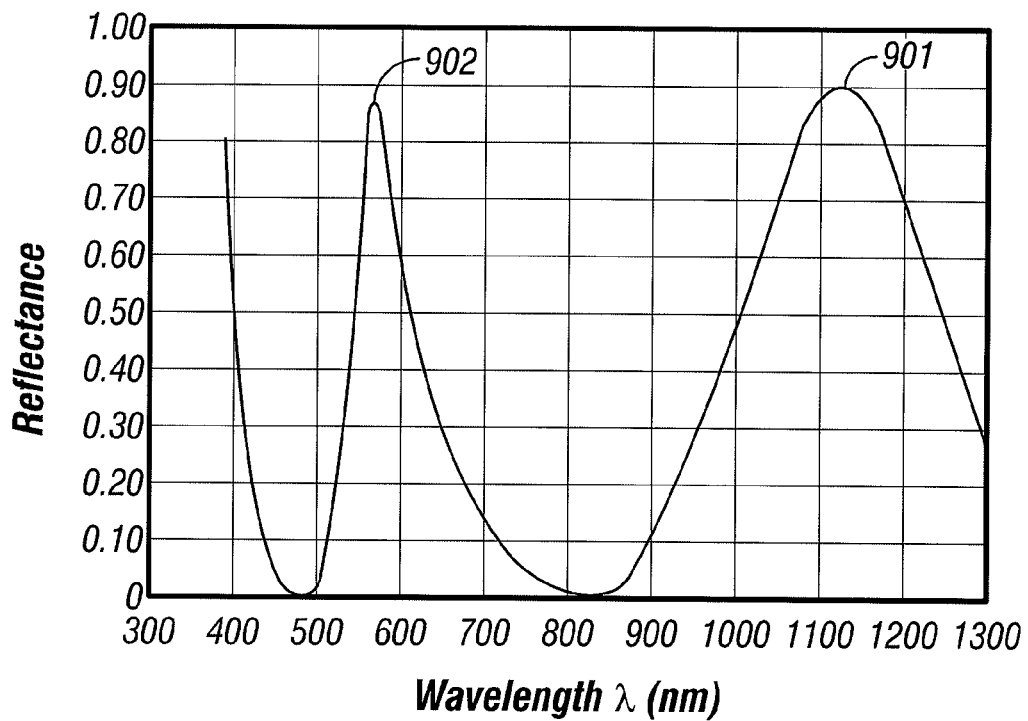
FIG. 9 illustrates the spectral response of an exemplary interferometric modulator with a bright state optical gap length of about 480 nm.

FIG. 9 illustrates the spectral response of an exemplary interferometric modulator. The vertical axis represents the reflectivity of the interferometric modulator while the horizontal axis represents the wavelength of the reflected light. As illustrated, the interferometric modulator produces a first order reflective response 901 peaked at about 1120 nm within the IR spectrum and a second order reflective response 902 peaked at about 560 nm within the visible spectrum.

Figure 10:
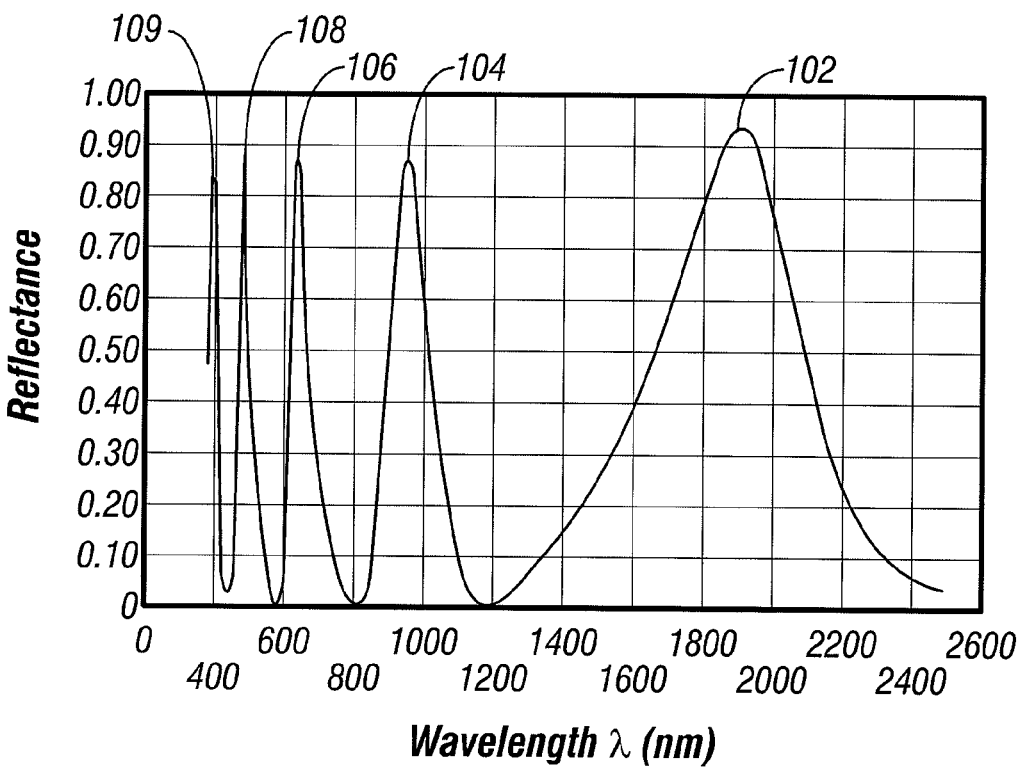
FIG. 10 illustrates the spectral response of another exemplary interferometric modulator.

In another embodiment, several higher order visible spectrum responses are combined to create a response that is perceived as a single hue. FIG. 10 illustrates the spectral response of another exemplary interferometric modulator. The vertical axis represents the reflectivity of the interferometric modulator while the horizontal axis represents the wavelength of the reflected light. As illustrated, the interferometric modulator has its bright state optical gap set such that the modulator has a first order reflective response 102 peaked at about 1900 nm within the IR spectrum. This leads to a second order reflective response 104 peaked within the near IR spectrum, and a third, fourth, and fifth order reflective responses 106, 108, and 109 within the visible spectrum. The third, fourth, and fifth order reflective responses together are perceived by a human observer as a white visible hue. Either one or both of the IR responses may be used to form an IR image, depending on the particular application.

A longer wavelength first order IR response may be created by increasing the optical gap in the bright state even further. When the interferometric modulator has its first order reflective response in the bright state to be in the far IR spectrum (approximately 3 to 12 μm), higher order responses may exist throughout the near IR and visible spectrum.

Figure 11:
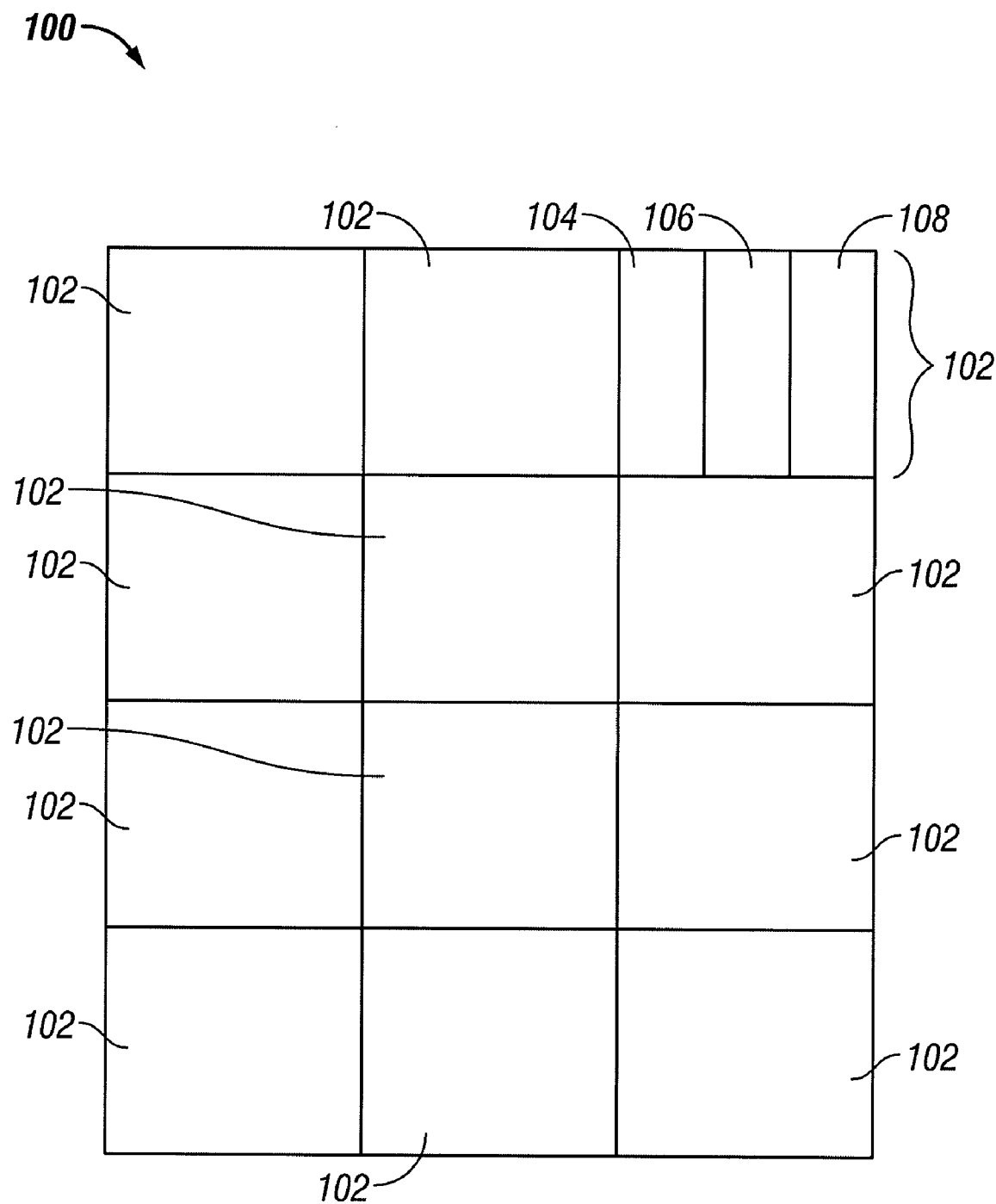
FIG. 11 illustrates one embodiment of a color display 100 visible in both the visible and IR spectrum.

FIG. 11 illustrates one embodiment of a color display 100 visible in both the visible and IR spectrum. The display 100 may comprise an array of pixels 102. Each pixel 102 comprises three sub-pixels, 104, 106, and 108. Each subpixel comprises an interferometric modulator as discussed above with regard to FIGS. 8-10, which is configured to selectively reflect light of a different wavelength in the visible range. As used herein, "reflecting light of a wavelength" could mean either reflecting light of one wavelength or light of a range of wavelengths. The hue generated by the pixel 102 will be determined by the color and amount of light reflected by each subpixel. In one embodiment, the three subpixels 104, 106, and 108 each have a near IR response and a visible response at a different primary color. When forming an image in the visible spectrum, all three subpixels are used together to form a desirable color to be perceived by a human observer. The IR operation of the display varies depending on the application.

In one embodiment, a specific IR response is required. This is mapped to a higher order response at one of the three primary colors. For example, a typical IR imaging device has an IR response at about 900 nm. A first order IR response at about 900 nm leads to a visible blue response at 450 nm. In this example, one of the subpixels has a 900 nm IR response and a visible blue response at 450 nm. When the display is used to display an IR visible image, only the subpixel having the visible blue response is driven by image signals. Other sub-pixels which do not have the required IR response are left unused. The display becomes a monochrome display in the IR spectrum, to match the monochrome nature of an IR imaging device. The display may operate in two distinct modes, a visible mode to display an image in the visible spectrum, and IR mode to display an image in the IR spectrum.

In another embodiment, an IR imaging device with a monochromatic output may accept a broader range of IR wavelengths. In that case, there may be more than one subpixel having an IR response falling within that range and therefore used. With two or more sub-pixels driven by image signals, the display may be operated as a higher resolution monochrome display in the IR spectrum. Alternatively the additional subpixels can be utilized to provide additional levels of grayscale for the IR image.

In another embodiment an IR imaging device may accept a broader range of IR wavelengths with an output dependent on the wavelength of the IR detected, such as by assigning a false color to each wavelength in a detected image. In this case, where more than one subpixel within each pixel has an IR response within the IR wavelength detection range of the imaging device, two or more subpixels may be driven to make use of the imaging device's capabilities. For example, the sub pixels within each pixel may be driven to reflect light of their respective IR wavelengths and create a false color image as the output of the IR imaging device.

In one embodiment, the display as described above with regard to FIG. 11 may operate in two modes, an IR mode and a visible spectrum mode, so as to apply alternative driving schemes. In the visible spectrum mode, each subpixel will be driven with appropriate driving signals. In the IR mode, it is not necessary for all subpixels to be driven with driving signals depending on the particular embodiment. In one embodiment, subpixels are driven with different signals in the IR spectrum mode from those used for visible spectrum mode. The display may be configured to switch between the two modes in order to create proper image and lower the power consumption.

In another embodiment, the subpixels may be driven with the same driving signals. As a result, no switch between two modes is needed. The display is viewable in both the visible and IR spectrum simultaneously.

The display device needs only to operate in the IR mode when illuminated with IR light. In one embodiment, the display may comprise an IR detector configured to detect incoming IR illumination. The IR detector may be any device suitable for this purpose, such as photo transistors and photo diode. The IR detector may be mounted, for example, adjacent to the display. A second detector responsive to visible illumination may also be included in combination to set operational modes according to the available type or types of illumination. The display works in the visible spectrum mode if only the visible illumination is detected, and in the IR mode if only the IR illumination is detected. The display determines a type of illumination is detected if a pre-determined density or amount of that type of illumination is detected. The mode in which the display works when there are both types of illuminations or neither type of illuminations depends on the particular application.

An IR-only display configured to reflect light only in the IR spectrum may be created by combining an IR filter with any of the visible/IR displays as described above. The IR filter may be designed to be substantially transparent to IR light and opaque to visible light. The IR filter may be placed, for example, between the display array and a viewer. In one embodiment, an IR filter including multiple layers is deposited onto the glass substrate 20 (see FIG. 1) of the display using the similar manufacturing processes as the display array including the interferometric modulator.

Figure 12:
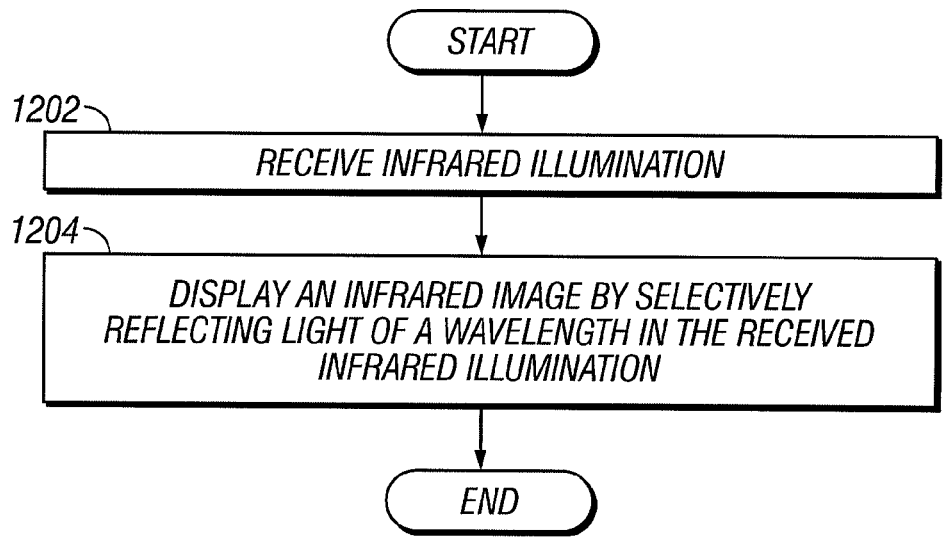
FIG. 12 is a flowchart illustrating one embodiment of a method of displaying an infrared image in a display described herein.

FIG. 12 is a flowchart illustrating one embodiment of a method of displaying an infrared image in a display described herein. Depending on the embodiment, certain steps of the method may be removed, merged together, or rearranged in order. Though the steps below are described as being performed by the array driver 22, these steps can also be performed by the processor 21 (see FIG. 2). In the exemplary embodiment, the display comprises an array of interferometric modulators.

The method starts at a block 1202, where infrared illumination is received by the display. Next at a block 1204, the display device displays an infrared image by selectively reflecting light of a wavelength in the received infrared illumination. The display displays an infrared image by interferometrically modulating the incoming infrared illumination.

Figure 13:
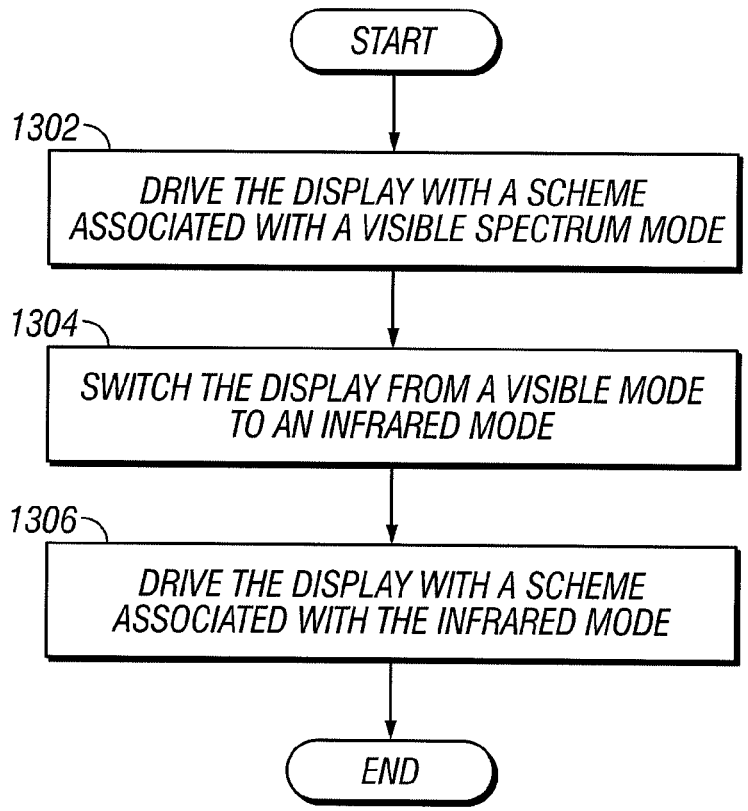
FIG. 13 is a flowchart illustrating one embodiment of a method of operating a display between the IR mode and the visible spectrum mode.

FIG. 13 is a flowchart illustrating one embodiment of a method of operating a display between the IR mode and the visible spectrum mode. Depending on the embodiment, certain steps of the method may be removed, merged together, or rearranged in order. Though the steps below are described as being performed by the array driver 22, these steps can also be performed by the processor 21 (see FIG. 2). In the exemplary embodiment, the display comprises an array of interferometric modulators. The display is configured to interferometrically modulating received illumination to form an image in both modes.

The method starts at a block 1302, where the display is driven with a scheme associated with the visible spectrum mode. Moving to a block 1304, the display is switched from the visible spectrum mode to the IR mode. The display is switched to the IR mode when, for example, the array driver 22 receives a signal from the IR detector indicating a pre-determined density or amount of IR illumination is received. In another example, the display is switched to the IR mode in response to a user request. Next at a block 1306, the display is driven with a scheme associated with the IR mode. For a display wherein each pixel comprises three sub-pixels, one or more sub-pixel may be left undriven in the IR mode depending on the application.

The embodiments described herein provide various benefits, among the others, over the existing approaches. First, many embodiments can operate in the visible and IR spectrum simultaneously. Second, these embodiments provide a reflective display which emits no IR radiation, other than to reflect the incident IR illumination. Third, the visible color version of the display offers enhanced resolution or grayscale operation in the IR mode. Last, certain embodiments include an array of interferometric modulators which have the low power, always on benefits.

In the foregoing description, each display comprises a display element configured to selectively reflect at least light of a first wavelength in the infrared range and light of a second wavelength in the visible range. An interferometric modulator has been used as an example of the display element. It should be noted that the foregoing embodiments may use other display elements which may reflect light within the visible and IR spectrum and therefore shall not be limited to a display comprising an interferometric modulator.

The foregoing embodiments describe a display that is viewable in multiple spectral ranges. A display viewable in both IR and visible spectrum is used as an example for illustration purpose only. Other embodiments of the display may be viewable in multiple spectral ranges including, but not limited to, IR and visible spectrum. For instance, a display may include a display element (e.g., an interferometric modulator) which can selectively reflect light of a first range of wavelengths and a second range of wavelengths, wherein each of the first and second ranges are within one of the ultraviolet, visible, or infrared spectrums.

In one embodiment, the display includes a display element that can selectively reflect light of a first wavelength in the visible spectrum and of a second wavelength in the ultraviolet spectrum. In one embodiment, the display includes a display element that can selectively reflect light of a first wavelength in the ultraviolet spectrum and a second wavelength in the ultraviolet spectrum. In one embodiment, the display includes a display element that can selectively reflect light of a first wavelength in the infrared spectrum, a second wavelength in the visible spectrum, and a third wavelength in the ultraviolet spectrum.

In certain embodiments, the display may include an interferometric modulator configured to selectively reflect light of a first wavelength in the visible spectrum in the on or bright state and light of a second wavelength in the ultraviolet spectrum in the off or dark state. The ultraviolet spectrum ranges, for example, approximately from 200 nm to 400 nm. The interferometric modulator is configured to reflect light of approximately 200 nm in the off or dark state. Depending on the ultraviolet detecting device used, the bright/dark states in the ultraviolet spectrum may be reversed. If the ultraviolet detecting device is configured to detect a bright state in response to an ultraviolet light centered around 300 nm, a pixel in a bright state looks bright to a user looking at the display in the ultraviolet spectrum. If the ultraviolet detecting device is configured to detect a bright state in response to an ultraviolet light centered around 200 nm, a pixel in a bright state looks dark to a user looking at the display in the ultraviolet spectrum, and vice versa, and therefore the display works in reverse for the ultraviolet spectrum. If necessary, this may be compensated by using a different driving scheme in the ultraviolet spectrum from one in the visible spectrum.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A display, comprising:
    a display element comprising
        a partially reflective fixed layer,
        a reflective movable layer movable between an actuated position and an unactuated position, and
        an optical resonant gap having a length defined between the fixed layer and the movable layer,
    wherein the optical resonant gap length is configured to have, when the movable layer is in the unactuated position, a gap length that allows the display element to reflect light with a first order reflective response of a first wavelength in the infrared range and a second order reflective response of a second wavelength in the visible range.

2. The display of claim 1, wherein the display element forms a pixel.

3. The display of claim 1, wherein the display element forms an interferometric modulator.

4. The display of claim 1, wherein the first wavelength of the first order reflective response is within the range of approximately 800 to 1200 nm.

5. The display of claim 1, wherein the first wavelength of the first order reflective response is approximately 1900 nm.

6. The display of claim 1, wherein the display element is further configured to reflect light of a third and fourth wavelength in the visible range, and wherein reflecting light of a second, third, and fourth wavelength collectively and operatively displays light of an approximately white hue.

7. The display of claim 6, wherein the first wavelength is within the range of approximately 3 to 12 μm.

8. The display of claim 1, further comprising a filter located between the display element and a viewer, the filter being transparent to infrared light and opaque to visible light.

9. The display of claim 1, wherein the display is configured to work in a visible mode and an infrared mode, and the display is configured to be driven by a different driving scheme in each mode.

10. The display of claim 9, wherein the display configured to switch to the infrared mode when infrared illumination is detected.

11. The display of claim 9, further comprising an infrared detector configured to detect infrared illumination and send a signal to switch the display into the infrared mode when infrared illumination is detected.

12. The display of claim 11, wherein the infrared detector comprises a phototransistor or a photodiode.

13. The display of claim 1, further comprising:
    a processor that is configured to communicate with said display element, said processor being configured to process image data; and
    a memory device that is configured to communicate with said processor.

14. The display of claim 13, further comprising a driver circuit configured to send at least one signal to the display elements.

15. The display of claim 14, further comprising a controller configured to send at least a portion of the image data to the driver circuit.

16. The display of claim 13, further comprising an image source module configured to send said image data to said processor.

17. The display of claim 16, wherein the image source module comprises at least one of a receiver, transceiver, and transmitter.

18. The display of claim 13, further comprising an input device configured to receive input data and to communicate said input data to said processor.

19. A color display, comprising:
    a pixel comprising at least three reflective display elements, each display element being configured to selectively reflect light of a different wavelength in the visible range, each display element comprising
        a partially reflective fixed layer,
        a reflective movable layer movable between an actuated position and an unactuated position, and
        an optical resonant gap having a length defined between the fixed layer and the movable layer; and
    wherein the gap length of at least one of the three reflective display elements is configured to have, when the movable layer is in the unactuated position, a gap length that reflects light with a first order reflective response of a first wavelength in the infrared range and a second order reflective response of a second wavelength in the visible range.

20. The display of claim 19, wherein each display element forms a subpixel.

21. The display of claim 19, wherein the three display elements form a pixel.

22. The display of claim 19, wherein each display element forms an interferometric modulator.

23. The display of claim 19, wherein each display element is configured to selectively reflect light of approximately a different one of the three primary colors: red, blue, and green.

24. The display of claim 19, wherein at least two of the three reflective display element is further configured to selectively reflect light of a wavelength in the infrared range.

25. The display of claim 19, wherein the display is configured to work in a visible mode and an infrared mode, and the display is driven by a different driving scheme in each mode.

26. The display of claim 25, wherein the display is switched to the infrared mode when infrared illumination is detected.

27. The display of claim 25, wherein one or more of the three display elements which is not configured to reflect light of a wavelength in the infrared range is not driven by image data, while the display operates in infrared mode.

28. The display of claim 25, further comprising an infrared detector configured to detect infrared illumination and send a signal to switch the display into the infrared mode when infrared illumination is detected.

29. The display of claim 28, wherein the infrared detector comprises a phototransistor or a photodiode.

30. A display, comprising:
    a display element comprising means for selectively reflecting light of a wavelength in the visible range and light of a wavelength in the infrared range, the selectively reflecting means comprising an optical resonant gap between a reflective movable layer and a partially reflective fixed layer, the optical resonant gap configured such that the display element has a first order reflective response of a first wavelength in the infrared range when the movable layer is in an unactuated position, and to have second order reflective response of a second wavelength in the visible range; and means for sending at least one signal to the reflecting means.

31. The display of claim 30, wherein the reflecting means comprises an interferometric modulator.

32. The display of claim 30, wherein the sending means comprises a driver circuit.

33. The display of claim 30, further comprising means for blocking or absorbing light outside the infrared range.

34. The display of claim 33, wherein the blocking means comprises a light filter.

35. The display of claim 30, wherein the display is configured to work in a visible mode and an infrared mode, and the display is driven by a different driving scheme in each mode.

36. The display of claim 35, further comprising means for detecting infrared illumination.

37. The display of claim 36, wherein the display is configured to switch to the infrared mode when the detecting means detects infrared illumination.

38. The display of claim 36, wherein the detecting means comprises a phototransistor or a photodiode.

39. A method of operating a display, comprising:
 driving a display with a drive scheme associated with a visible spectrum mode, the display including a display element having an optical resonant gap between a partially reflective movable layer and a partially reflective fixed layer, the optical resonant gap being configured to have, when the movable layer is in an unactuated position, a gap length that allows the display element to reflect light with a first order reflective response of a first wavelength in the infrared range and a second order reflective response of a second wavelength in the visible range;
 receiving a signal to switch the display driving mode from a visible mode to an infrared mode;
 switching the display from a visible mode to an infrared mode; and
 driving the display with a scheme associated with the infrared mode.

40. The method of claim 39, wherein the display is configured to provide an infrared image in the infrared mode by interferometrically modulating received infrared illumination.

41. The method of claim 39, wherein the display is switched to the infrared mode in response to a signal received from a user request to switch to the infrared mode.

42. The method of claim 39, further comprising detecting infrared illumination, and sending a signal to switch the display driving mode in response to the detecting infrared illumination.

43. A display, comprising:
 a first display element configured to selectively reflect light of a first range of wavelengths and a second range of wavelengths, wherein each of the first and second ranges are within one of the ultraviolet, visible, or infrared spectrums, the first display element comprising
  a partially reflective fixed layer,
  a reflective movable layer movable between an actuated position and an unactuated position, and
  an optical resonant gap having a length defined between the fixed layer and the movable layer; and
 wherein the optical resonant gap length is configured to have, when the movable layer is in the unactuated position, a gap length that allows the display element to reflect light with a first order reflective response of a first wavelength within one of the ultraviolet, visible, or infrared spectrums, and a second order reflective response of a second wavelength within another of the ultraviolet, visible, or infrared spectrums.

44. The display of claim 43, wherein the first range is within the ultraviolet spectrum and the second range is within either the visible or infrared spectrums.

45. The display of claim 43, wherein the first range is within the visible spectrum and the second rangy is within either the ultraviolet or infrared spectrums.

46. The display of claim 43, further comprising a second display element configured to selectively reflect light of a third range of wavelengths and a fourth range of wavelengths, wherein the first and third range are within the visible spectrums, and the second and fourth range are within the ultraviolet and infrared spectrums respectively.

* * * * *